US011971339B2

(12) United States Patent
Yamaguchi et al.

(10) Patent No.: US 11,971,339 B2
(45) Date of Patent: Apr. 30, 2024

(54) CENTRIFUGAL SEDIMENTATION-TYPE PARTICLE SIZE DISTRIBUTION MEASUREMENT DEVICE

(71) Applicants: HORIBA, Ltd., Kyoto (JP); Eppendorf Himac Technologies Co., Ltd., Hitachinaka (JP)

(72) Inventors: Tetsuji Yamaguchi, Kyoto (JP); Hitoshi Watanabe, Kyoto (JP); Hidetaka Osawa, Hitachinaka (JP); Ken Asakura, Hitachinaka (JP); Kenichi Nemoto, Hitachinaka (JP)

(73) Assignees: Horiba, Ltd., Kyoto (JP); Eppendorf Himac Technologies Co., Ltd., Hitachinaka (JP)

( * ) Notice: Subject to any disclaimer, the term of this patent is extended or adjusted under 35 U.S.C. 154(b) by 460 days.

(21) Appl. No.: 17/289,108

(22) PCT Filed: Oct. 29, 2019

(86) PCT No.: PCT/JP2019/042242
§ 371 (c)(1),
(2) Date: Apr. 27, 2021

(87) PCT Pub. No.: WO2020/090765
PCT Pub. Date: May 7, 2020

(65) Prior Publication Data
US 2022/0011213 A1    Jan. 13, 2022

(30) Foreign Application Priority Data
Oct. 31, 2018    (JP) .................................. 2018-205609

(51) Int. Cl.
*G01N 15/04*    (2006.01)

(52) U.S. Cl.
CPC ..... *G01N 15/042* (2013.01); *G01N 2015/045* (2013.01)

(58) Field of Classification Search
CPC .......... G01N 15/042; G01N 2015/045; G01N 15/0266; B04B 13/00; B04B 5/10; B04B 9/02
See application file for complete search history.

(56) References Cited

U.S. PATENT DOCUMENTS 4,047,847 A * 9/1977 Oikawa ................. F04D 13/025
                                                 417/370
6,262,799 B1 * 7/2001 Wardlaw ............... G01N 15/042
                                                 356/42
(Continued)

FOREIGN PATENT DOCUMENTS

EP    0940185 B1    2/2003
EP    1063514 B1    10/2006
(Continued)

OTHER PUBLICATIONS

PCT, International Search Report for the corresponding application No. PCT/JP2019/042242, dated Jan. 21, 2020, with English translation.
(Continued)

Primary Examiner — Tarun Sinha
(74) Attorney, Agent, or Firm — Lucas & Mercanti, LLP (57) ABSTRACT

A particle size distribution measurement device includes a cell holding body 31 that holds a measurement cell 2 containing a measurement sample and a dispersion medium and a reference cell 6 containing a reference sample and is rotated by a motor 322, and a cell discrimination mechanism 7 that discriminates the cells 2, 6 passing through a predetermined rotation position by using a magnetic force or electrostatic capacitance.

15 Claims, 10 Drawing Sheets

(56) References Cited

U.S. PATENT DOCUMENTS

| | | | |
|---|---|---|---|
| 6,285,450 B1* | 9/2001 | Thomas | G01N 15/042 356/244 |
| 2007/0155017 A1 | 7/2007 | Wyatt | |
| 2008/0056949 A1* | 3/2008 | Lee | G01N 33/54326 422/72 |
| 2019/0346354 A1* | 11/2019 | Yamaguchi | G01N 15/0211 |

FOREIGN PATENT DOCUMENTS

| | | |
|---|---|---|
| JP | S55-94175 U | 6/1980 |
| JP | S55-115350 U | 8/1980 |
| JP | S56-116651 U | 9/1981 |
| JP | S56-53895 Y | 12/1981 |
| JP | S62-195747 U | 12/1987 |
| JP | H11-2546 A | 1/1999 |
| JP | 2003-144977 A | 5/2003 |
| WO | 2018092573 A1 | 5/2018 |

OTHER PUBLICATIONS

Yoshiaki Togawa, "The CAPA-700 Particle-Size Distribution Analyzer Using Photo-Sedimentation with Gravitational and Centrifugal Acceleration," Readout, Horiba Technical Reports, Jan. 1992, pp. 23-29, No. 4, with English Abstract.
Extended European Search Report for the corresponding European Application No. 19880890.9, dated Jul. 6, 2022, with English translation.

* cited by examiner

CENTRIFUGAL SEDIMENTATION-TYPE PARTICLE SIZE DISTRIBUTION MEASUREMENT DEVICE

CROSS REFERENCE TO RELATED APPLICATION

This Application is a 371 of PCT/JP2019/042242 filed on Oct. 29, 2019, which, in turn, claimed the priority of Japanese Patent Application No. 2018-205609 filed on Oct. 31, 2018, both applications are incorporated herein by reference.

TECHNICAL FIELD

The present invention relates to a centrifugal sedimentation-type particle size distribution measurement device.

BACKGROUND ART

As a conventional centrifugal sedimentation-type particle size distribution measurement device, as illustrated in Non Patent Literature 1, there is one that rotates a measurement cell containing a measurement sample and a dispersion medium to settle particles in the measurement sample in the dispersion medium, and measures a particle size distribution of the measurement sample.

Here, the measurement cell is mounted on a rotation disk rotated by a motor, and a light source and a photodetector, which are a measurement optical system, are provided across the rotation disk. Further, the rotation disk is provided with a reference cell containing only the dispersion medium for weight balance. Further, the reference cell is also for eliminating the influence of change in the light amount of a light source by correcting a measured amount of light transmitted through the measurement cell with reference to the amount of reference light transmitted through the reference cell.

With the above configuration, the photodetector of the measurement optical system alternately detects light transmitted through the measurement cell and light transmitted through the reference cell, and a light intensity signal from the photodetector is alternately input to the CPU. For this reason, a light source and a photodetector are provided as a discrimination optical system for discriminating these signals. Similarly to the measurement optical system, the light source and the photodetector as a discrimination optical system are also provided across the rotation disk.

However, the light from the light source of the discrimination optical system becomes stray light and may be detected by the photodetector of the measurement optical system. When the photodetector of the measurement optical system detects the stray light from the light source of the discrimination optical system, there is a problem that measurement accuracy of the particle size distribution measurement decreases.

CITATION LIST

Non Patent Literature

Non Patent Literature 1: Yoshiaki Togawa, "Gravitational and Centrifugal Sedimentation-type Particle Size Distribution Measurement Device CAPA-700", Readout, HORIBA, Ltd., January 1992, No. 4, p. 23-29

SUMMARY OF INVENTION

Technical Problem

Accordingly, the present invention has been made to solve the above problem, and has a main object to eliminate the need for a discrimination optical system for discriminating cells to eliminate stray light generated by the discrimination optical system, and improve measurement accuracy by a measurement optical system.

Solution to Problem

Specifically, a centrifugal sedimentation-type particle size distribution measurement device according to the present invention includes a cell holding body that holds a measurement cell containing a measurement sample and a dispersion medium and a reference cell containing a reference sample and is rotated by a motor, and a cell discrimination mechanism that discriminates the cells passing through a predetermined rotation position by using a magnetic force or electrostatic capacitance.

In such a device, the cells passing through the predetermined rotation position are discriminated by the cell discrimination mechanism that uses a magnetic force or electrostatic capacitance, and thus a conventional discrimination optical system is unnecessary. Consequently, stray light generated by the discrimination optical system can be eliminated, and measurement accuracy by a measurement optical system can be improved.

As the cell discrimination mechanism, a mechanism having a magnet and a magnetic detection element is conceivable. In this case, as a specific arrangement mode of the magnet, it is desirable that the magnet is provided on the cell holding body or a rotation shaft connected to the cell holding body.

With this configuration, since the magnet is provided on the cell holding body or the rotation shaft, which is a rotation system, the magnetic detection element can be provided on a fixed side, and the device configuration can be simplified.

It is desirable that a plurality of the magnets is concentrically provided in the cell holding body, and a magnet for discriminating the measurement cell and a magnet for discriminating the reference cell have different arrangement patterns in a circumferential direction from each other.

With this configuration, the cells can be discriminated at a magnetic detection timing by the magnetic detection element during rotation.

In order to absorb vibrations of the cell holding body for stable rotation, it is desirable that the rotation shaft is a flexible shaft.

The centrifugal sedimentation-type particle size distribution measurement device further includes a light irradiation unit that irradiates the cells with light, a light detection unit that detects light that has passed through the cells, and a particle size distribution calculation unit that acquires a light intensity signal from the light detection unit and calculates a particle size distribution.

A detection timing of a change due to the magnetic force or electrostatic capacitance (for example, the magnetic detection timing by the magnetic detection element) differs depending on a rotation speed of the cell holding body. Thus, when the motor is provided with an encoder, it is desirable that the cell discrimination mechanism has a cell discrimination unit that discriminates the cell based on an output signal of the encoder and a change due to a magnetic force or electrostatic capacitance.

With this configuration, the encoder can know a rotation speed of the motor (cell holding body), and the cells can be discriminated by the detection timing of the change due to the magnetic force or electrostatic capacitance according to the rotation speed. Specifically, the cells can be discriminated by the magnetic detection timing by the magnetic detection element according to the rotation speed.

It is desirable that the cell discrimination unit and the particle size distribution calculation unit perform signal processing in synchronization with the output signal of the encoder.

Specifically, it is desirable that the cell discrimination unit acquires the output signal of the encoder and a detection signal indicating a change due to a magnetic force or electrostatic capacitance to discriminate the cell, and transmits a discrimination signal thereof to the particle size distribution calculation unit, and the particle size distribution calculation unit performs calculation processing by discriminating the light intensity signal of the light detection unit into light transmitted through the measurement cell and light transmitted through the reference cell based on the discrimination signal.

In order to prevent the measurement cell or the reference cell from being damaged by rotation, it is desirable that the centrifugal sedimentation-type particle size distribution measurement device further includes a cell protection member that is interposed between the cell holding body and the measurement cell or the reference cell and disperses a centrifugal force applied to the measurement cell or the reference cell to prevent damage to the measurement cell or the reference cell.

Further, it is desirable that the centrifugal sedimentation-type particle size distribution measurement device further includes a detection device provided at a position that faces a rotation region of the measurement cell by the cell holding body, and a cell protection member that disperses a centrifugal force applied to the measurement cell to prevent damage to the measurement cell, in which a transmission portion is formed in the cell protection member corresponding to the detection device.

Specifically, it is desirable that the centrifugal sedimentation-type particle size distribution measurement device further includes the cell holding body to which the measurement cell made of a translucent resin is attached, the cell holding body being made of metal and rotated by the motor, and a light source and a photodetector that are provided across the rotation region of the measurement cell by the cell holding body and constitute the detection device, in which in the cell protection member, a light transmission portion through which light is transmitted from the light source to the photodetector is formed.

The centrifugal sedimentation-type particle size distribution measurement device has an accommodation space that rotatably accommodates the cell holding body. When the cell holding body rotates in this accommodation space, pressure in the rotation center of the cell holding body becomes negative. Taking advantage of this characteristic, it is desirable that an intake port is formed on a rotation center axis of the cell holding body on an upper wall forming the accommodation space. Here, it is desirable that the intake port is provided with a filter.

In addition, as the cell discrimination mechanism, a mechanism having a recess portion or a projecting portion and a distance measurement element is conceivable. In this case, as a specific arrangement mode of the magnet, it is desirable that the recess portion or the projecting portion is provided on the cell holding body or a rotation shaft connected to the cell holding body.

Advantageous Effects of Invention

According to the present invention described above, it is possible to eliminate the need for a discrimination optical system for discriminating cells to eliminate stray light generated by the discrimination optical system, and improve measurement accuracy by a measurement optical system.

REFERENCE SIGNS LIST 100 centrifugal sedimentation-type particle size distribution measurement device
2 measurement cell
3 cell rotation mechanism
31 cell holding body
34 cell protection member
4 light irradiation unit
5 light detection unit
6 reference cell
7 cell discrimination mechanism
71 magnet
72 magnetic detection element
12 cell discrimination unit

DESCRIPTION OF EMBODIMENTS

Hereinafter, a centrifugal sedimentation-type particle size distribution measurement device according to one embodiment of the present invention will be described with reference to the drawings.

Figure 1:
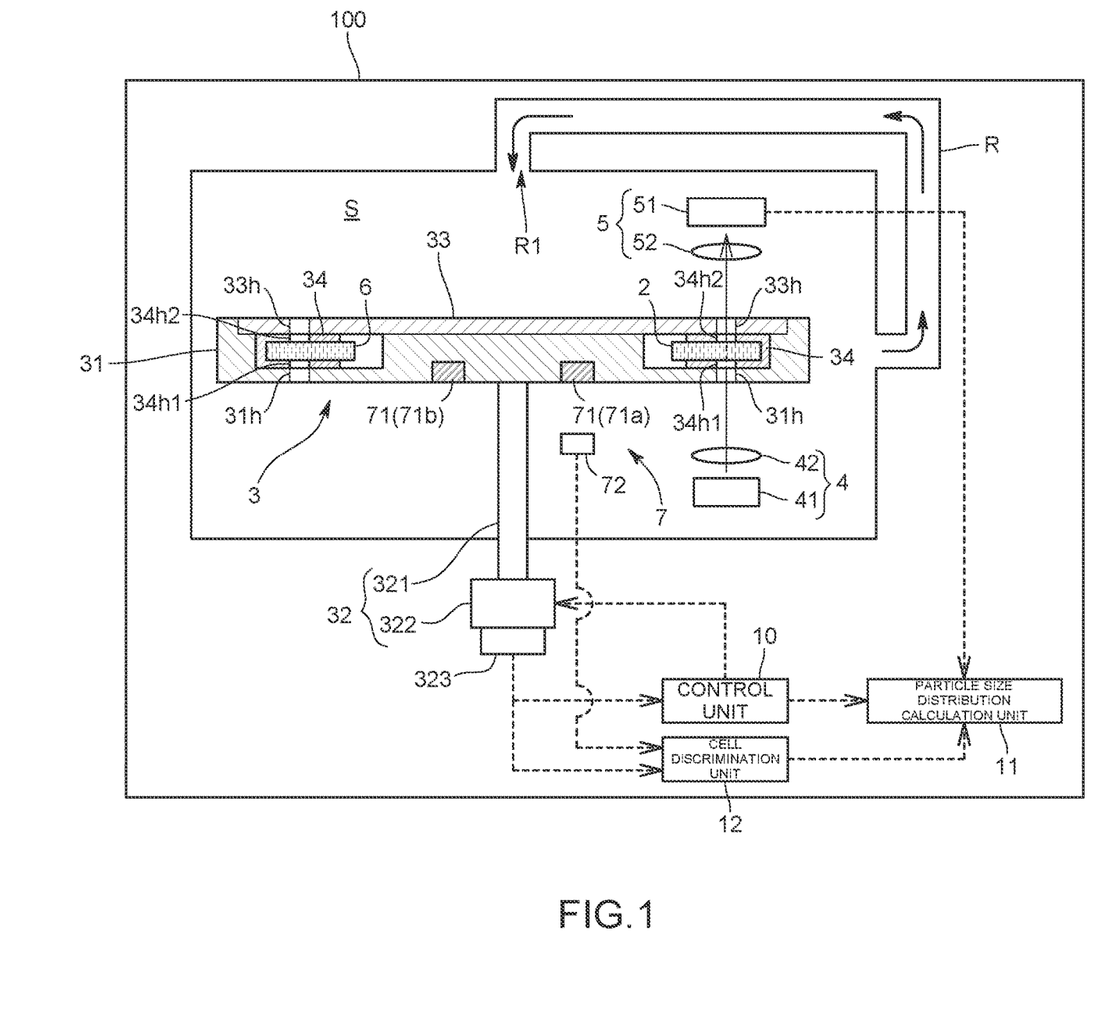
FIG. 1 is a view schematically illustrating a configuration of a centrifugal sedimentation-type particle size distribution measurement device of a present embodiment.

As illustrated in FIG. 1, a centrifugal sedimentation-type particle size distribution measurement device 100 of the present embodiment includes a measurement cell 2 containing a sample suspension constituted of a measurement sample and a dispersion medium (for example, water), a cell rotation mechanism 3 that rotates the measurement cell 2, and a light irradiation unit 4 and a light detection unit 5 provided across a rotation passage region of the measurement cell 2 by the cell rotation mechanism 3.

The measurement cell 2 is a square cell formed of, for example, a resin-made translucent material. In the present embodiment, a reference cell 6 is also provided, and the reference cell 6 contains water as a dispersion medium.

The cell rotation mechanism 3 has a cell holding body 31 to which the measurement cell 2 and the reference cell 6 are detachably attached, and a rotation unit 32 that rotates the cell holding body 31.

The cell holding body 31 has, for example, a disk shape, and the measurement cell 2 and the reference cell 6 are attached so as to be located across a center of rotation thereof. Note that the cell holding body 31 is made of metal.

Further, on an upper surface of the cell holding body 31, a cover body 33 is provided to prevent the measurement cell 2 and the reference cell 6 from being unexpectedly removed during rotation (see FIG. 1).

Furthermore, the cell holding body 31 is provided with a cell protection member 34 between the holding body 31 and the cells 2, 6, so as to receive and disperse centrifugal force applied to the cells 2, 6 to prevent damage to the cells 2, 6. This cell protection member 34 is made of the same resin as the measurement cell 2, for example. The cell protection member 34 can be removed from the cell holding body 31 together with the cells 2, 6.

The cell holding body 31 is housed in an accommodation space S formed inside a housing of the particle size distribution measurement device 100. Then, a circulation flow path R is connected to the accommodation space S. One end of the circulation flow path R is connected to an upper wall of the accommodation space S, and the other end of the circulation flow path R is connected to a side wall of the accommodation space S. In the circulation flow path R connected in this manner, pressure in the one end connected to the accommodation space S becomes negative, and pressure in the other end connected to the outer side in a radial direction becomes positive. Consequently, in the circulation flow path R, gas flows from the other end toward the one end, and the opening at one end is an intake port R1. Here, the intake port R1 is located on a rotation center axis of the cell holding body 31 on the upper wall of the accommodation space S.

As illustrated in FIG. 1, the rotation unit 32 has a rotation shaft 321 connected to a central portion on a lower surface of the cell holding body 31 and a motor 322 that rotates the rotation shaft 321. The rotation shaft 321 is flexible and is constituted of a flexible shaft capable of absorbing vibrations of the cell holding body 31 and rotating at high speed. Further, the motor 322 is provided with an encoder 323. Then, a control unit 10 that has acquired an output signal of the encoder 323 controls the rotation speed of the motor 322. Note that the rotation shaft 321 may be integrally formed with the cell holding body 31 or may be formed separately. Further, the rotation shaft 321 may be constituted of one member or may be constituted a plurality of members connected.

As illustrated in FIG. 1, the light irradiation unit 4 is provided below the rotation passage region (cell holding body 31) of the cells 2, 6. The light irradiation unit 4 of the present embodiment has, for example, a light source 41 such as an LED and a condensing lens 42 that condenses light emitted from the light source 41. The light emitted by the light irradiation unit 4 is irradiated to the measurement cell 2 or the reference cell 6 through a light passage hole 31$h$ formed in the cell holding body 31 and a light passage hole 34$h$1 formed in the cell protection member 34.

As illustrated in FIG. 1, the light detection unit 5 is provided above the rotation passage region (cell holding body 31) of the cells 2, 6. The light detection unit 5 of the present embodiment has a photodetector 51 and a condensing lens 52 that condenses light detected by the photodetector 51. The light detected by the light detection unit 5 passes through the cells 2, 6 and passes through a light passage hole 34$h$2 formed in the cell protection member 34 and a light passage hole 33$h$ formed in the cover body 33, and is condensed by the condensing lens 52.

A light intensity signal obtained by the photodetector 51 is acquired by a particle size distribution calculation unit 11, and particle size distribution data is calculated by the particle size distribution calculation unit 11. Note that the particle size distribution calculation unit 11 converts the light intensity signal into absorbance and calculates the particle size distribution data from a time change thereof. The particle size distribution data is displayed on a display by a display unit that is not illustrated.

Thus, as illustrated in FIG. 1, the centrifugal sedimentation-type particle size distribution measurement device 100 of the present embodiment has a cell discrimination mechanism 7 having magnets 71 and a magnetic detection element 72 for discriminating cells passing through a predetermined rotation position. The predetermined rotation position is a measurement space between the light source 41 and the photodetector 51.

Figure 2:
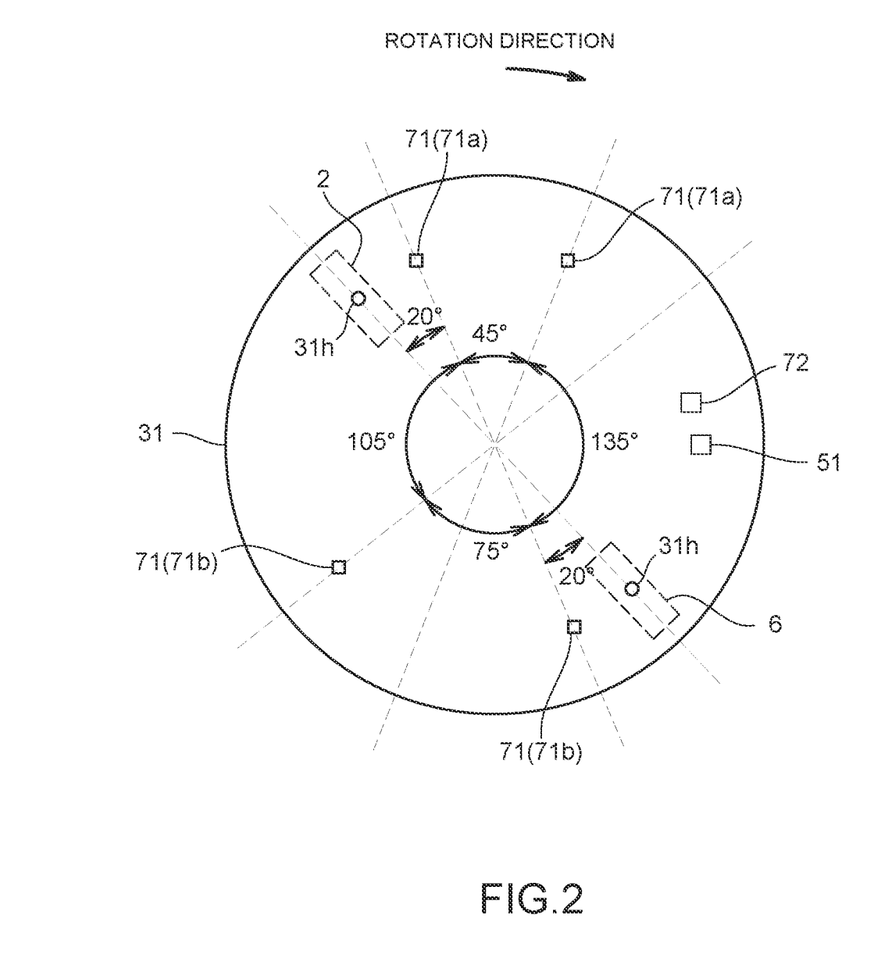
FIG. 2 is a schematic view illustrating arrangement patterns of magnets in a cell holding body of the same embodiment.

The magnets 71 are provided on the cell holding body 31. Specifically, as illustrated in FIG. 2, a plurality of magnets 71 is concentrically provided in the cell holding body 31. The plurality of magnets 71 includes a magnet 71$a$ for discriminating the measurement cell 2 and a magnet 71$b$ for discriminating the reference cell 6.

Then, the magnet 71$a$ for discriminating the measurement cell 2 and the magnet 71$b$ for discriminating the reference cell 6 have different arrangement patterns in a circumferential direction from each other. In the present embodiment, there are two magnets 71 each for discriminating either of the cells 2, 6, which are configured so that intervals between them in the circumferential direction are different from each other. In FIG. 2, two magnets 71$a$ for discriminating the measurement cell 2 are at a short interval, and two magnets 71$b$ for discriminating the reference cell 6 are at a long interval. Note that the intervals may be reversed. Other specific arrangements are as illustrated in FIG. 2.

The magnetic detection element 72 is a Hall sensor provided on a fixed side to face the magnet 71 and measures magnetic flux density using the Hall effect. The magnetic detection element 72 is provided at one place in a rotation trajectory of the magnet 71.

Then, a detection signal of the magnetic detection element 72 is input to a cell discrimination unit 12. The cell discrimination unit 12 acquires the detection signal of the magnetic detection element 72, discriminates the cells 2, 6, and transmits a discrimination signal to the particle size distribution calculation unit 11. Based on the discrimination signal, the particle size distribution calculation unit 11 discriminates the light intensity signal of the photodetector 51 into light transmitted through the measurement cell 2 and light transmitted through the reference cell 6, and performs calculation processing. In this manner, the cell discrimination unit 12 and the particle size distribution calculation unit 11 perform signal processing in synchronization with the output signal of the encoder 323.

Figure 3:
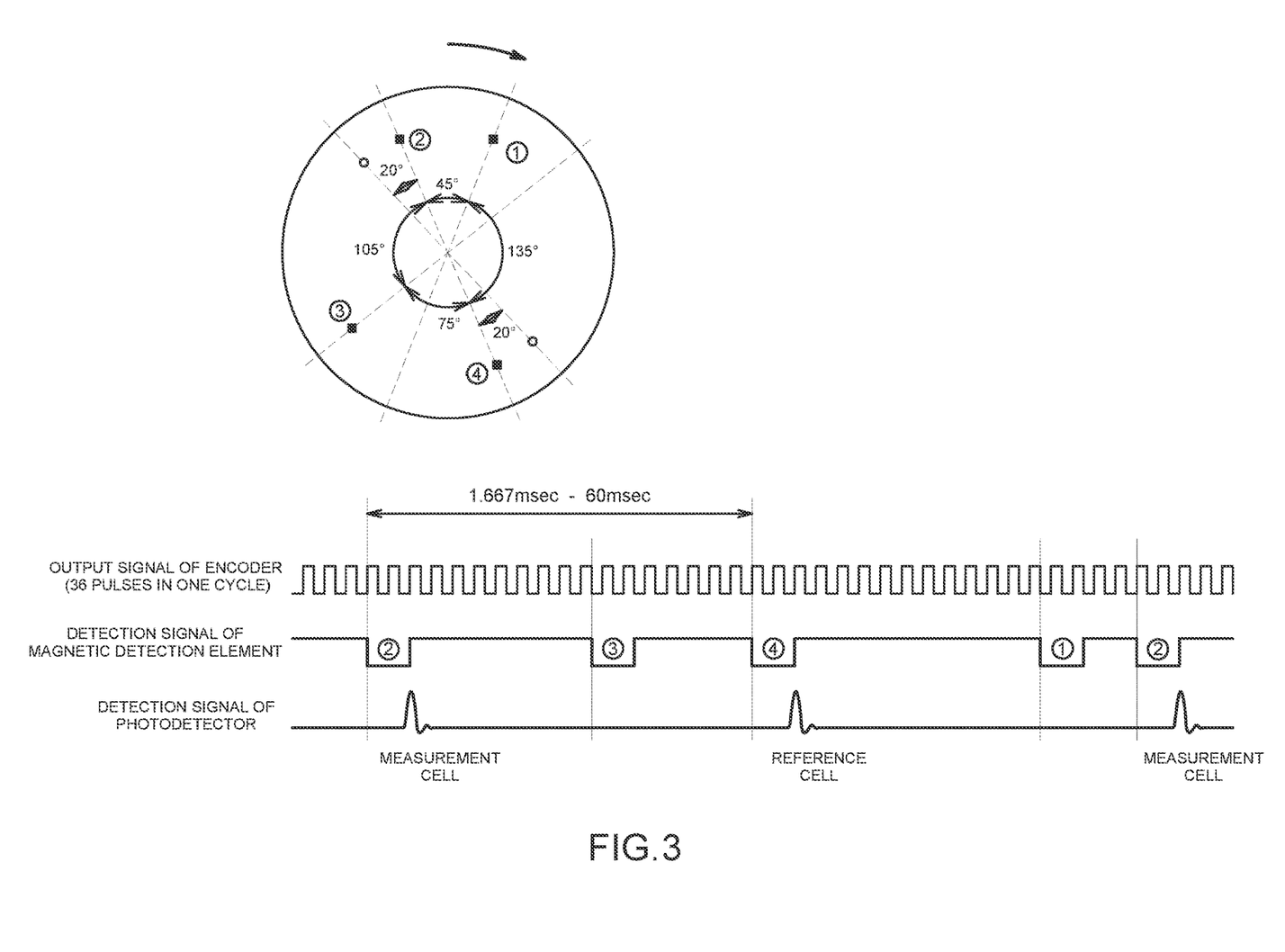
FIG. 3 is a schematic view illustrating signals of an encoder, a magnetic detection element, and a photodetector of the same embodiment.

Here, as illustrated in FIG. 3, the cell discrimination unit 12 acquires the output signal of the encoder 323 provided in the motor 322 of the cell rotation mechanism 3, and discriminates the cells 2, 6 based on the output signal of the encoder 323 and the detection signal of the magnetic detection element 72. Note that in FIG. 3, in the output signal of the encoder, 36 pulses are output in one cycle, indicating that a detection interval between the magnet 71a (magnet "2") on a rear side of rotation for discriminating the measurement cell and the magnet 71b (magnet "4") on a rear side of rotation for discriminating the reference cell changes between 1.667 msec and 60 msec depending on the rotation speed.

Specifically, the cell discrimination unit 12 stores data indicating the number of output signals (pulse signals) of the encoder 323 at detection intervals at which the magnet 71 is detected. For example, the cell discrimination unit 12 stores that four output signals (pulse signals) are detected at a detection interval of two magnets 71a for discriminating the measurement cell. Further, the cell discrimination unit 12 also stores that seven output signals (pulse signals) are detected at a detection interval of two magnets 71b for discriminating the reference cell. In addition, the cell discrimination unit 12 stores that 11 output signals (pulse signals) are detected at a detection interval between the magnet 71a on the rear side of rotation for discriminating the measurement cell and the magnet 71b on a front side of rotation for discriminating the reference cell. Further, the cell discrimination unit 12 also stores that 14 output signals (pulse signals) are detected at a detection interval between the magnet 71b on the rear side of rotation for discriminating the reference cell and the magnet 71a on a front side of rotation for discriminating the measurement cell.

Then, the cell discrimination unit 12 counts the number of pulse signals from the immediately preceding magnetic detection signal and, based on the count number of pulse signals when the next magnetic detection signal is detected, determines whether the magnet 71a for discriminating the measurement cell is detected or the magnet 71b for discriminating the reference cell is detected. Thus, the cell discrimination unit 12 discriminates the cells 2, 6 that pass through the predetermined rotation position.

Effect of Present Embodiment

With the centrifugal sedimentation-type particle size distribution measurement device 100 of the present embodiment, a conventional discrimination optical system is unnecessary because the cells 2, 6 passing through the predetermined rotation position are discriminated by the cell discrimination mechanism 7 having the magnet 71 and the magnetic detection element 72. Consequently, stray light generated by the discrimination optical system can be eliminated, and measurement accuracy of the particle size distribution measurement can be improved.

Other Modified Embodiments

Note that the present invention is not limited to the above-described embodiment.

For example, the cell discrimination unit 12 may detect the rotation speed of the motor 322 (cell holding body 31) from the output signal of the encoder 323, obtain a detection interval time of each magnet 71 according to the rotation speed, and determine whether the magnet 71a for discriminating the measurement cell is detected or the magnet 71b for discriminating the reference cell is detected by the detection interval of each magnet 71.

In the above-described embodiment, the cell discrimination unit 12 performs the cell discrimination by using both the output signal of the encoder 323 and the detection signal of the magnetic detection element 72, but the cell discrimination may be performed using only the detection signal of the detection element 72 without using the output signal of the encoder 323.

Further, in the above-described embodiment, the magnetic detection element 72 for discriminating the cells 2, 6 is in common, but a magnetic detection element 72 for discriminating the measurement cell 2 and a magnetic detection element 72 for discriminating the reference cell 6 may each be provided. In this case, it is conceivable to provide the magnet 71a for discriminating the measurement cell 2 and the magnet 71b for discriminating the reference cell 6 at different positions in a radial direction to prevent mutual false detection.

Furthermore, the position where the magnet 71 is provided is not limited to the lower surface of the cell holding body 31, and may be a side surface or an upper surface. When the magnet 71 is provided on the side surface of the cell holding body 31, it is conceivable that the magnetic detection element 72 is provided on a side thereof, specifically, on the side wall of the accommodation space of the cell holding body 31. When the magnet 71 is provided on the upper surface of the cell holding body 31, it is conceivable that the magnetic detection element 72 is provided above the magnet 71, specifically, on the upper wall of the accommodation space of the cell holding body 31.

Figure 4:
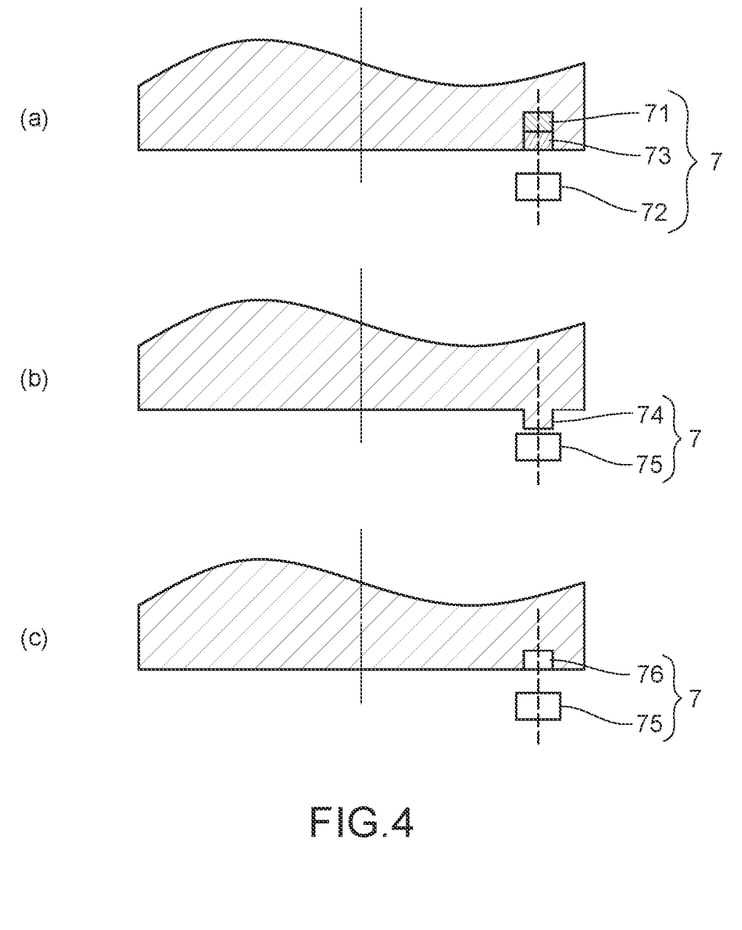
FIG. 4 is a schematic view illustrating a modification example of a cell discrimination mechanism.

In addition to the above-described embodiment, the cell discrimination mechanism 7 is only required to have a configuration that uses a magnetic force or electrostatic capacitance, and for example, one illustrated in FIG. 4 can be considered. FIG. 4(a) illustrates a configuration in which a magnetic material 73 is combined with the magnet 71 of the above-described embodiment to increase the magnetic flux density. FIG. 4(b) illustrates a configuration in which a projecting portion 74 is provided on the cell holding body 31 or the rotation shaft 321 or the like, and the cells 2, 6 are discriminated by, for example, a distance measurement element 75 such as a proximity switch that measures the distance to the projecting portion 74. FIG. 4(c) illustrates a configuration in which a recess portion 76 is provided in the cell holding body 31 or the rotation shaft 321 or the like, and the cells 2, 6 are discriminated by, for example, a distance measurement element 75 such as a proximity switch that measures the distance to the recess portion 76. Note that the proximity switch may be one that uses a magnetic field of high-frequency oscillation type or magnetic type or the like, or one that uses an electric field of electrostatic capacitance type or the like.

Figure 5:
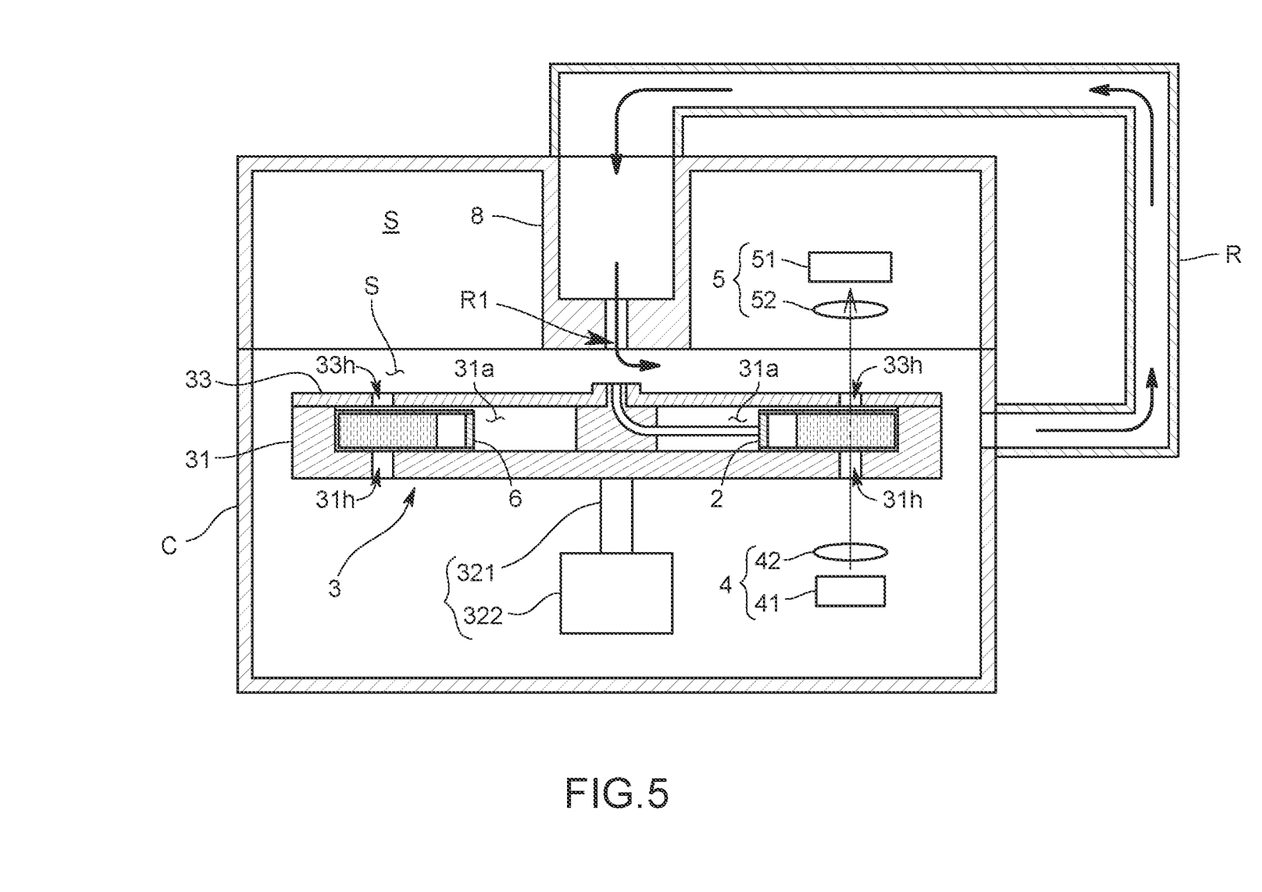
FIG. 5 is a view schematically illustrating a configuration of a centrifugal sedimentation-type particle size distribution measurement device of a modified embodiment.
Figure 6:
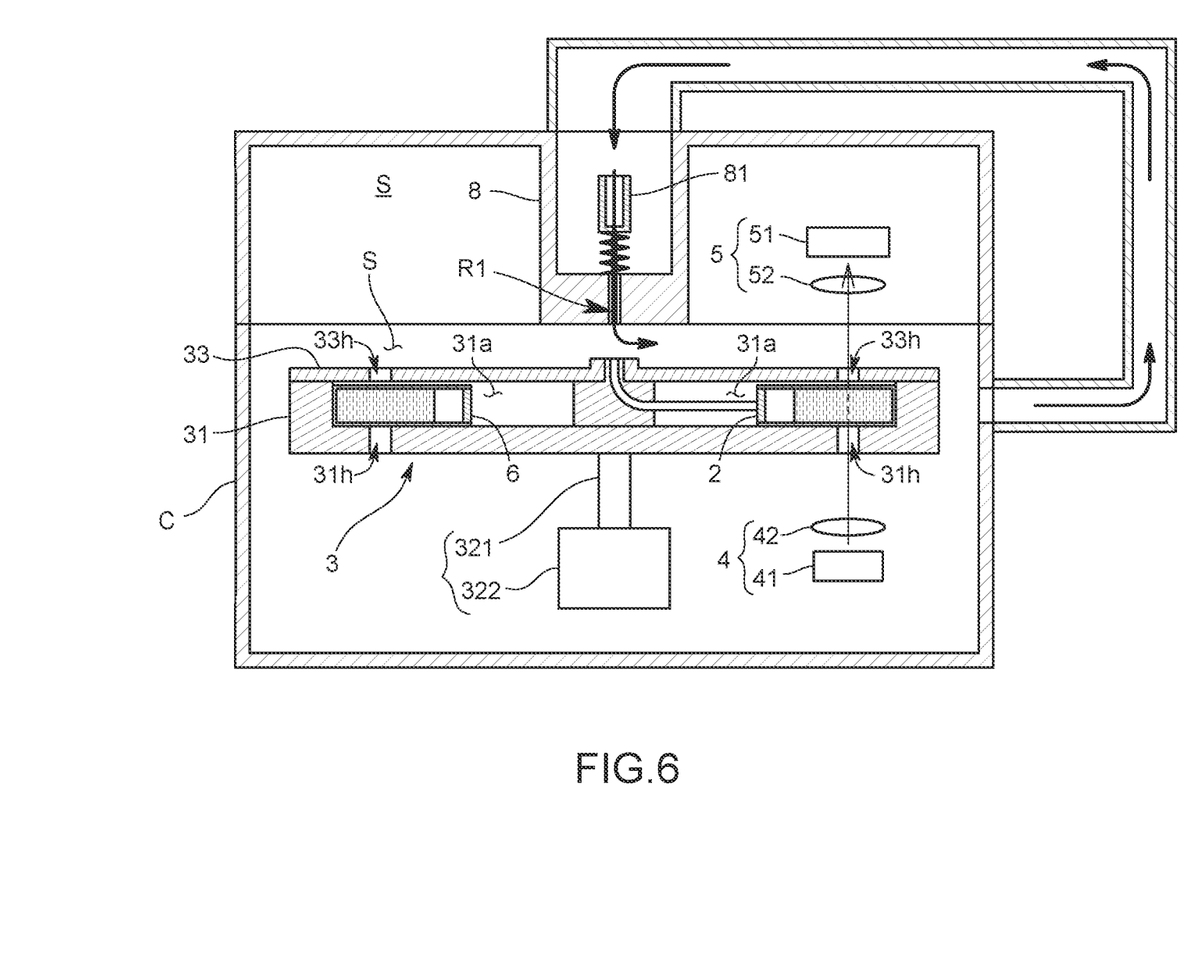
FIG. 6 is a view schematically illustrating a configuration of a centrifugal sedimentation-type particle size distribution measurement device of the modified embodiment.
Figure 7:
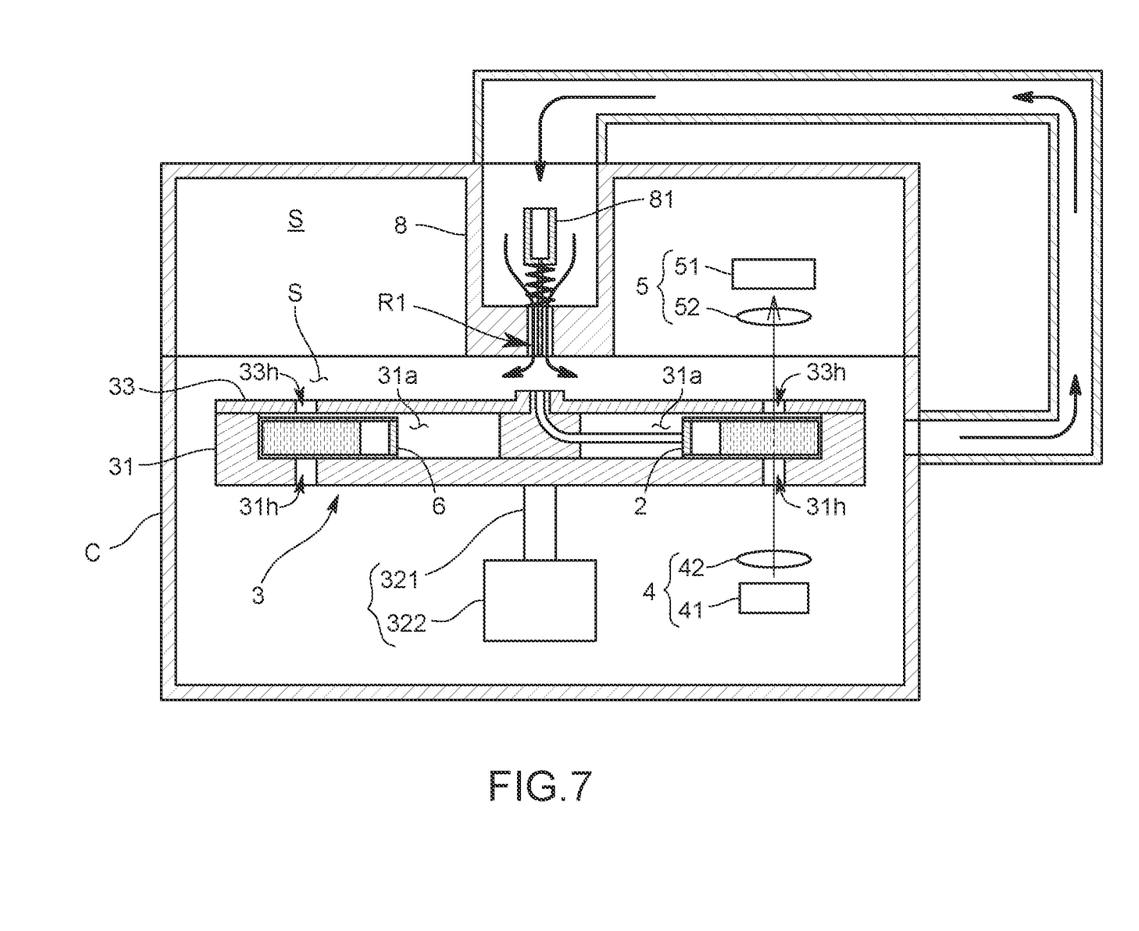
FIG. 7 is a view schematically illustrating a configuration of a centrifugal sedimentation-type particle size distribution measurement device of the modified embodiment.
Figure 8:
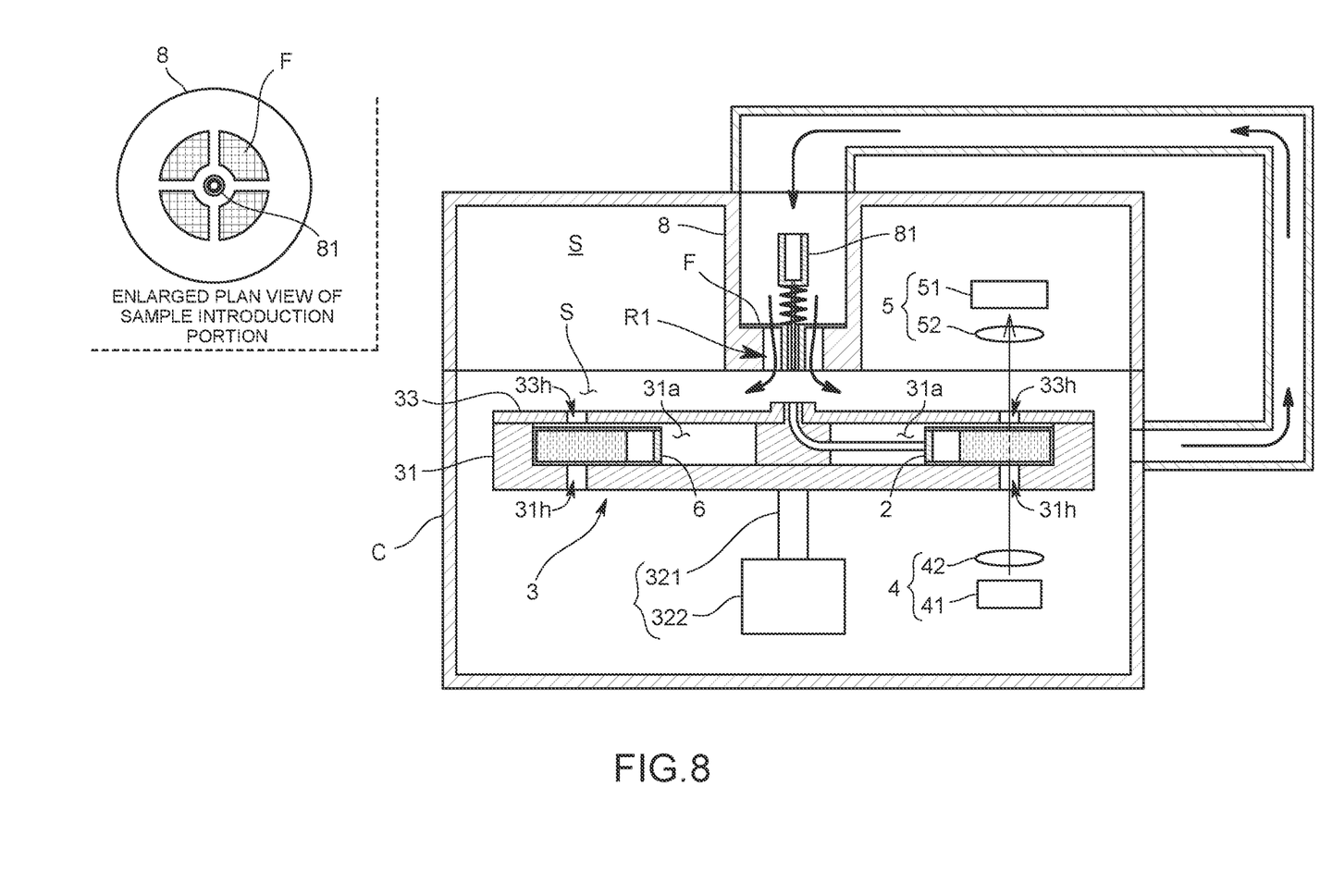
FIG. 8 is a view schematically illustrating a configuration of a centrifugal sedimentation-type particle size distribution measurement device of the modified embodiment.

Further, as illustrated in FIGS. 5 to 8, when the upper wall of the accommodation space S is constituted of an opening-closing lid of a storage container C and a sample introduction portion 8 is formed on the opening-closing lid, the circulation flow path R may be configured by using the sample introduction portion 8. In this case, an intake port R1 of the circulation flow path R is formed in the sample introduction portion 8. Note that the sample introduction portion 8 is provided corresponding to a rotation center portion of the cell holding body. FIG. 5 illustrates an example in which the sample introduction portion 8 is constituted of a through hole, and FIGS. 6 to 8 illustrate a configuration in which the sample introduction portion 8 has a sample introduction needle 81. Further, FIG. 8 illustrates an example in which a filter F is provided at the intake port R1.

In the above-described embodiment, the measurement cell is irradiated with light to detect transmitted light of the light, but when an isotope sample or a self-luminous sample is housed in the measurement cell, a configuration not including the light irradiation unit may be employed.

Figure 9:
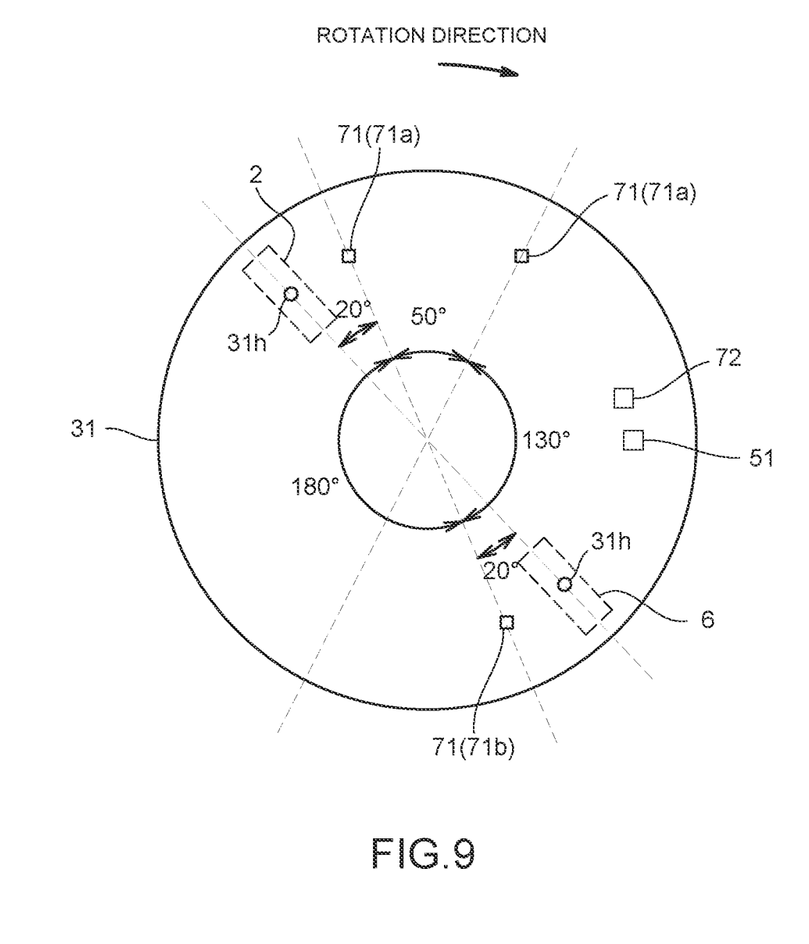
FIG. 9 is a schematic view illustrating an arrangement pattern of magnets in the cell holding body of the modified embodiment.

Further, in the above-described embodiment, the cell discrimination mechanism 7 includes two each of the magnets 71a and the magnets 71b, but the present invention is not limited to this. In another embodiment, a configuration may be employed in which two magnets of one of the magnets 71a or 71b is provided and only one magnet of the other is provided, so that their circumferential intervals are different from each other. Specifically, as illustrated in FIG. 9, two magnets 71a for discriminating the measurement cell 2 may be provided, and one magnet 71b for discriminating the reference cell 6 may be provided. Note that the numbers may be reversed. Other specific arrangements are illustrated in FIG. 9.

Figure 10:
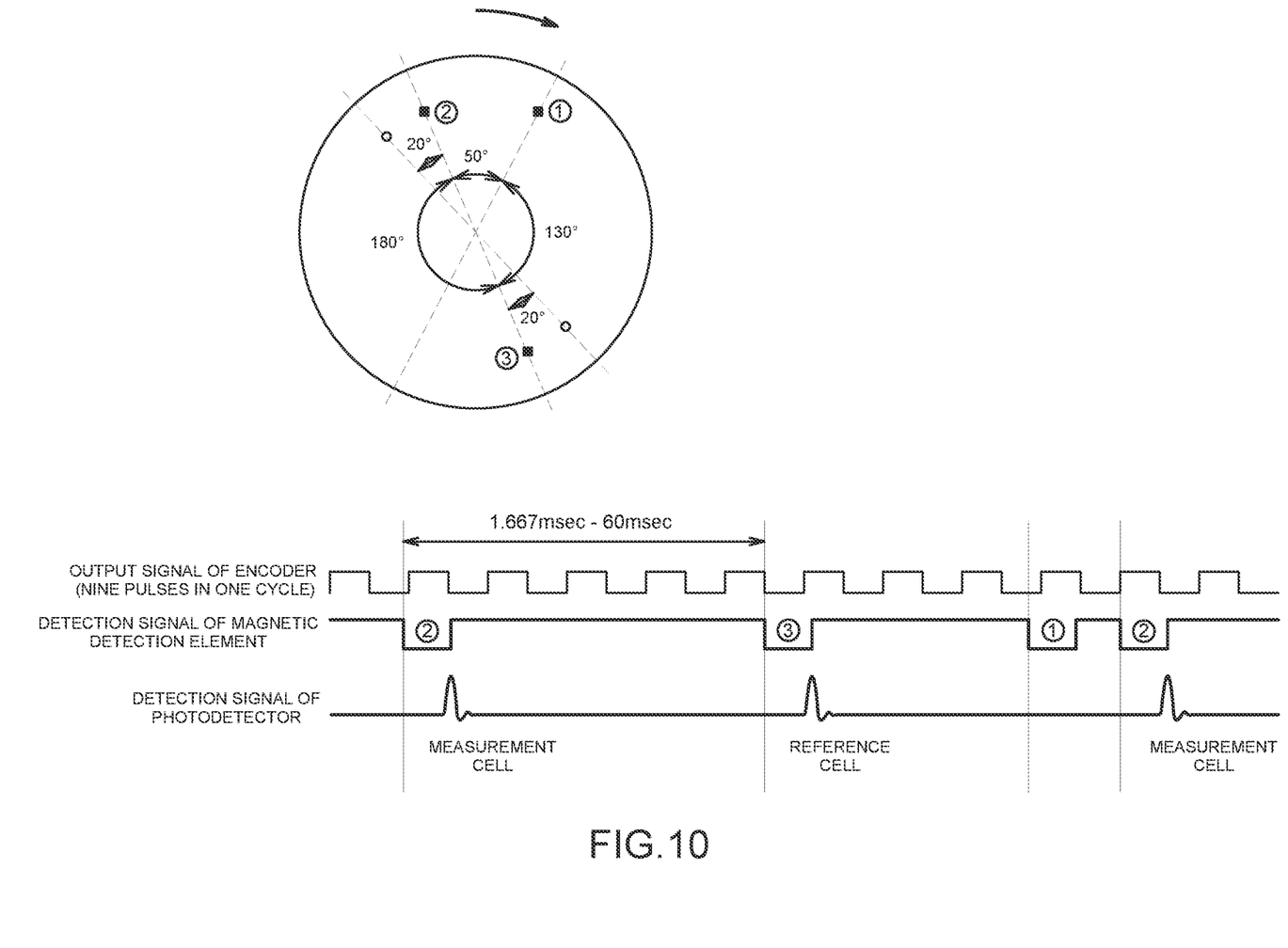
FIG. 10 is a schematic view illustrating signals of an encoder, a magnetic detection element, and a photodetector according to a modified embodiment.

In this case, the output signal of the encoder may be configured so that nine pulses are output in one cycle as illustrated in FIG. 10. Then, the cell discrimination unit 12 may be configured to store that one output signal (pulse signal) is detected at the detection interval of the two magnets 71a for discriminating the measurement cell, store that four output signals (pulse signals) are detected at the detection interval between the magnet 71a (magnet "2") on the rear side of rotation for discriminating the measurement cell and the magnet 71b (magnet "3") for discriminating the reference cell, and store that three output signals (pulse signals) are detected at the detection interval between the magnet 71b for discriminating the reference cell and the magnet 71a (magnet "1") on the front of rotation for discriminating the measurement cell.

In addition, various embodiments may be modified or combined as long as it does not contradict the gist of the present invention.

INDUSTRIAL APPLICABILITY

According to the present invention, it is possible to eliminate the need for a discrimination optical system for discriminating cells to eliminate stray light generated by the discrimination optical system, and improve measurement accuracy by a measurement optical system.

The invention claimed is:

1. A centrifugal sedimentation-type particle size distribution measurement device comprising:
 a cell holding body that holds a measurement cell containing a measurement sample and a dispersion medium and a reference cell containing a reference sample and is rotated by a motor; and
 a cell discrimination mechanism that discriminates the measurement cell and the reference cell passing through a predetermined rotation position by using a magnetic force or electrostatic capacitance.

2. The centrifugal sedimentation-type particle size distribution measurement device according to claim 1, wherein
 the cell discrimination mechanism has a magnet and a magnetic detection element, and
 the magnet is provided on the cell holding body or a rotation shaft connected to the cell holding body.

3. The centrifugal sedimentation-type particle size distribution measurement device according to claim 2, wherein
 a plurality of the magnets is concentrically provided in the cell holding body, and
 a magnet for discriminating the measurement cell and a magnet for discriminating the reference cell have different arrangement patterns in a circumferential direction from each other.

4. The centrifugal sedimentation-type particle size distribution measurement device according to claim 2, wherein the rotation shaft is a flexible shaft.

5. The centrifugal sedimentation-type particle size distribution measurement device according to claim 1, further comprising:
 a light irradiation unit that irradiates the cells with light;
 a light detection unit that detects light that has passed through the cells; and
 a particle size distribution calculation unit that acquires a light intensity signal from the light detection unit and calculates a particle size distribution.

6. The centrifugal sedimentation-type particle size distribution measurement device according to claim 5, wherein
 the motor is provided with an encoder, and
 the cell discrimination mechanism has a cell discrimination unit that discriminates the cell based on an output signal of the encoder and a change due to the magnetic force or the electrostatic capacitance.

7. The centrifugal sedimentation-type particle size distribution measurement device according to claim 6, wherein the cell discrimination unit and the particle size distribution calculation unit perform signal processing in synchronization with the output signal of the encoder.

8. The centrifugal sedimentation-type particle size distribution measurement device according to claim 7, wherein
 the cell discrimination unit acquires the output signal of the encoder and a detection signal indicating a change due to the magnetic force or the electrostatic capacitance to discriminate the cell, and transmits a discrimination signal thereof to the particle size distribution calculation unit, and
 the particle size distribution calculation unit performs calculation processing by discriminating the light intensity signal of the light detection unit into light transmitted through the measurement cell and light transmitted through the reference cell based on the discrimination signal.

9. The centrifugal sedimentation-type particle size distribution measurement device according to claim 1, further comprising a cell protection member that is interposed between the cell holding body and the measurement cell or the reference cell and disperses a centrifugal force applied to the measurement cell or the reference cell to prevent damage to the measurement cell or the reference cell.

10. The centrifugal sedimentation-type particle size distribution measurement device according to claim 1, further comprising:
 a detection device provided at a position that faces a rotation region of the measurement cell by the cell holding body; and
 a cell protection member that disperses a centrifugal force applied to the measurement cell to prevent damage to the measurement cell,
 wherein a transmission portion is formed in the cell protection member corresponding to the detection device.

11. The centrifugal sedimentation-type particle size distribution measurement device according to claim 10, further comprising:

the cell holding body to which the measurement cell made of a translucent resin is attached, the cell holding body being made of metal and rotated by the motor; and a light source and a photodetector that are provided across the rotation region of the measurement cell by the cell holding body and constitute the detection device, wherein in the cell protection member, a light transmission portion through which light is transmitted from the light source to the photodetector is formed.

12. The centrifugal sedimentation-type particle size distribution measurement device according to claim 1, further comprising an accommodation space that rotatably accommodates the cell holding body, wherein an intake port is formed on a rotation center axis of the cell holding body on an upper wall forming the accommodation space.

13. The centrifugal sedimentation-type particle size distribution measurement device according to claim 12, wherein the intake port is provided with a filter.

14. The centrifugal sedimentation-type particle size distribution measurement device according to claim 1, wherein the cell discrimination mechanism has a recess portion or a projecting portion and a distance measurement element, and the recess portion or the projecting portion is provided on the cell holding body or a rotation shaft connected to the cell holding body.

15. The centrifugal sedimentation-type particle size distribution measurement device according to claim 1, wherein the cell discrimination mechanism exhibits a first detection signal pattern for the measurement cell and a second detection signal pattern for the reference cell during a rotation of the cell holding body, the second detection signal pattern being different than the first detection signal pattern.

* * * * *